Sept. 28, 1926.  E. W. TODD  1,601,383
LIQUID TESTING APPARATUS
Filed June 23, 1925  2 Sheets-Sheet 2
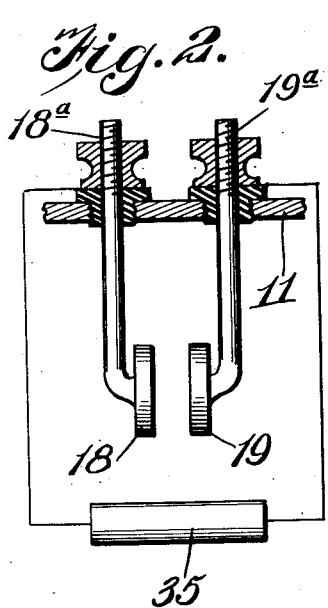
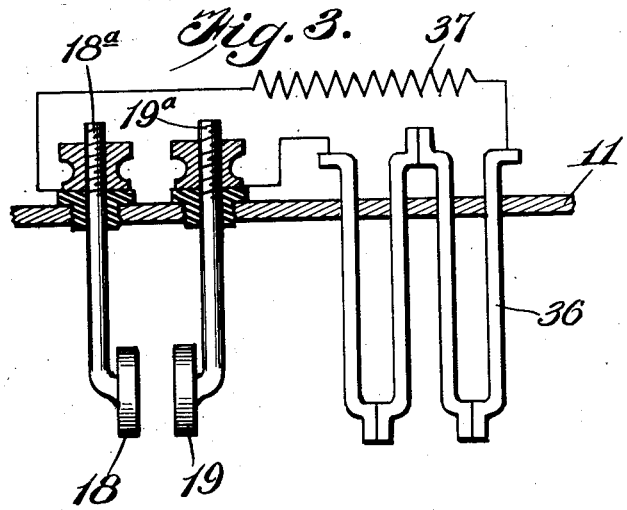
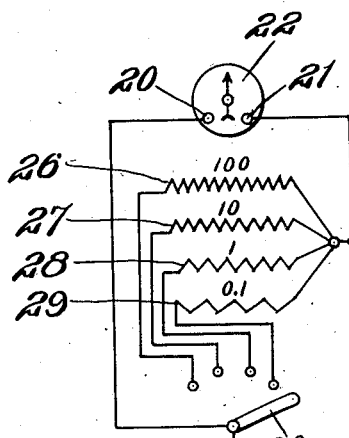
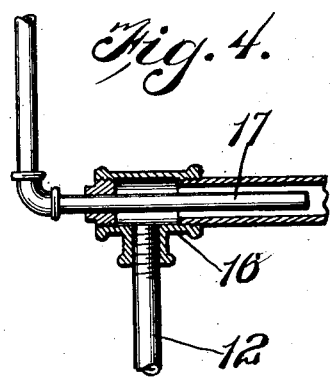
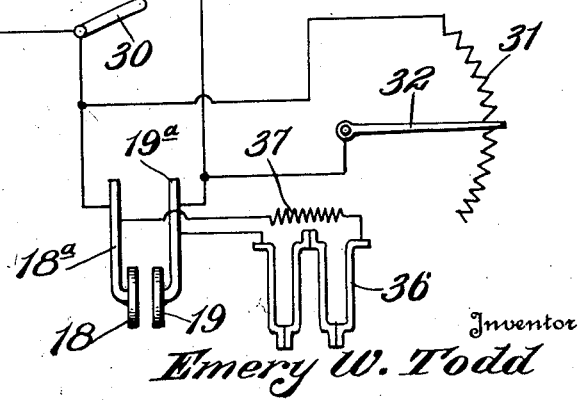
Inventor
Emery W. Todd
By Watson E. Coleman
Attorney Patented Sept. 28, 1926.

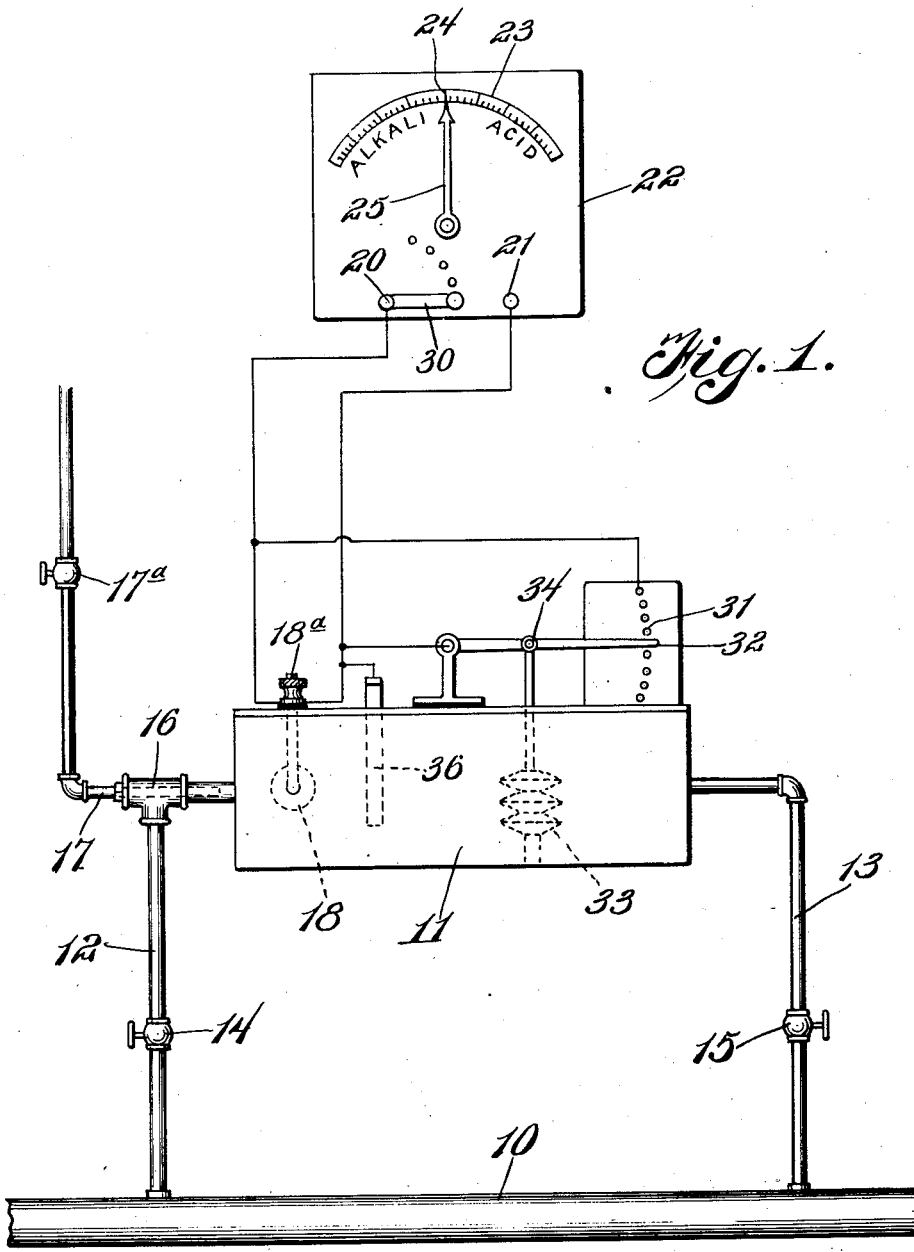

1,601,383

UNITED STATES PATENT OFFICE.

EMERY W. TODD, OF MITCHELL, NEBRASKA.

LIQUID-TESTING APPARATUS.

Application filed June 23, 1925. Serial No. 39,148.

This invention relates to liquid testing apparatus and more particularly to an apparatus for testing liquids for acidity or alkalinity.

An important object of the invention is to provide a device of this character which gives a continuous indication of not only the acid or alkali content of a moving liquid but likewise gives the proportion of such acid or alkali content.

A further object of the invention is to provide an instrument of this character comprising the combination of a galvanometer and a pair of electrodes of such character that the direction of current produced is reversed if these electrodes are withdrawn from an acid solution and placed in an alkali solution.

The invention further resides in means for correcting the inaccuracies of the reading of the galvanometer resulting from changes in temperature of the liquids which are being tested, it having been found that a considerable change of reading results from such temperature variations.

A further object of the invention is to provide means for preventing polarization of the electrodes employed.

A further and more specific object of the invention is the provision of a device which is readily attached to a tank or conduit through which the liquid to be tested is being passed and having means which promotes circulation of the fluid therethrough and at the same time prevents polarization of the electrodes employed.

A still further object of the invention is to provide a device of this character which is capable of use with liquids having very small acid or alkali content or with liquids where the alkali or acid content is considerable without the necessity of changing the galvanometer employed.

These and other objects I attain by the construction shown in the accompanying drawings, wherein for the purpose of illustration is shown a preferred embodiment of my invention and wherein:—

Figure 1 is a side elevation of liquid testing apparatus constructed in accordance with my invention;

Figure 2 is a detailed view showing the use of a different form of temperature variations control;

Figure 3 is a detailed view showing a heat induced current neutralizing connections;

Figure 4 is a detailed sectional view showing the injector employed; and

Figure 5 is a wiring diagram of the form of apparatus shown in Figure 1.

Referring now more particularly to the drawings, the numeral 10 indicates a conduit or tank through which the liquid to be tested is being passed. In accordance with my invention, I provide a chamber 11 which is arranged adjacent this conduit and has an inlet connection 12 and an outlet connection 13 provided with control valves 14 and 15 respectively and engaging the conduit 10 at points spaced longitudinally thereof. The inlet 12, of course, engages the conduit first as regards the direction of flow of fluid through the conduit. The inner connection includes a T-joint 16, the head of which is directed longitudinally of the chamber 11 and communicates at one end with the chamber. The opposite end has a reduction plug through which is entered a reduced air inlet 17 projecting into or nearly into the chamber. This air inlet will communicate with a suitable source of air under pressure and will act as an injector to cause flow of fluid through the chamber 11 and also serves an additional function, which will hereinafter appear.

Arranged within the chamber 11 are a pair of electrodes 18 and 19, the electrode 18 being preferably of iron, while the electrode 19 is of an alloy of antimony-cadmium having proportions of fifty parts of antimony to two to three parts of cadmium. The proportion of cadmium employed depends upon the grade of antimony employed in the electrode 19. The electrodes have their terminals 18ª, 19ª, connected across the terminals 20, 21 of a galvanometer 22. The dial of this galvanometer, indicated at 23, will be graduated in terms of acid and alkali content from a zero center 24 to which the needle of the galvanometer points when no current is passing through the galvanometer. Across the terminals of the galvanometer and preferably included in the construction thereof is arranged a series of shunt resistances 26, 27, 28 and 29. One terminal of each of these resistances is connected with one terminal of the galvanometer while one terminal of a control switch 30 selectively engageable with the second terminals of the resistances is connected to the other terminal of the galvanometer. If the resistance of the galvanometer is arbitrarily set at 100, the resistance 26 to 29 inclusive preferably have the following values: The resistance 26 100, the resistance 27 10, the resistance 28 1 and the resistance 29 0.1. Accordingly if the switch is not engaged with any of the resistances 26 to 29, the entire current across the terminals 18ª, 19ª, will pass through the galvanometer. If the resistance 26 is engaged, one-half the current will pass through the galvanometer and the reading provided must be multiplied by two. In order to compensate for changes of temperature of the tested fluid flowing through the chamber 11, a variable resistance 31 is arranged across the terminals 18ª, 19ª and means are preferably provided whereby this resistance automatically varies to compensate for the changes in temperature.

In the form shown in Figure 1, a shiftable switch arm 32 is shown as coacting with the resistance and this arm is automatically shifted by a thermostat 33 arranged within the chamber 11 and suitably connected with the arm, as at 34. In Figure 2, an automatic rheostat is provided consisting of a resistance element 35 exposed to the heat of the contents of the chamber 11 and having a high negative resistance temperature co-efficient of electrical resistance so that as the temperature raises, the conductor increases in value and less current flows through the galvanometer. In either structure, the effect is to reduce the resistance as the temperature increases, it having been found that the current set up increases with an increase in temperature.

I have further found that using the electrodes, as described, a current is set up due to heat alone and this current across the electrodes which is set up due to heat is likewise in the same direction and is in the same direction as the current set up by alkali in the solution. It will be obvious under these conditions where a weak acid solution was being tested at a high temperature, the reading would be for alkali instead of acid and if the solution being tested were relatively strong in acid, the reading would be inaccurate and show too low a percentage of acidity. This, I have overcome by placing a thermocouple 36 in the solution which couple is electrically insulated from the solution and a resistance 37 is connected between one terminal of the thermocouple and one of the electrodes while the second terminal of the couple is directly connected to the second electrode, the connections being such that the polarity of the current induced in the thermocouple opposes the current set up by an alkali solution through the electrodes and accordingly the current which is set up through the electrodes by heating of the solution which is being tested. The resistance is so regulated that at a certain temperature of a neutral solution in which the electrodes are immersed, the reading of the galvanometer will be zero and the heat induced current across the electrodes is completely neutralized.

In the use of the device, the installation generally shown in Figure 1 is recommended. To start the device, the valve 17ª of the air line is opened together with the valves 14 and 15 and the injector action will cause the fluid from the main line or tank to be drawn through the chamber 11 and into contact with the electrodes 18 and 19. A current is set up by this contact, the direction of which is determined by the quality of the fluid, being in one direction if the fluid be acid and in the opposite direction if the fluid be alkali. This current acting upon the galvonometer will cause a reading to be produced upon the galvanometer. If the current set up is so heavy that the galvanometer needle offsets to its limit in either direction, the switch is operated until the galvanometer reads upon the dial and then the reading is multiplied by the co-efficient of the switch tap or resistance which is being employed. The action of the temperature compensating element has hereinbefore been described and needs no enlargement. It is obvious that if the fluid employed is steadily acid or alkali, polarization of the electrodes might ordinarily be set up but this is prevented by the air jet. In cases where the circulation can be readily provided without the necessity of the air jet and polarization does not occur, the air jet may be eliminated.

Since the structure of the device is capable of a certain range of change and modification without materially departing from the spirit of my invention, I do not limit myself to such specific structure except as hereinafter claimed.

I claim:—

1. Testing apparatus of the type described comprising a primary cell having electrodes reversely affected by acid or alkali electrolytes and a galvanometer across the terminals of the cell graduated in terms of acidity and alkalinity.

2. Testing apparatus of the type described comprising a primary cell having electrodes reversely affected by acid or alkali electrolytes, a galvanometer across the terminals of the cell graduated in terms of acidity and alkalinity and means associated with the cell for preventing variation of the current output thereof due to changes in temperature of the electrolyte.

3. Testing apparatus of the type described comprising a primary cell having electrodes reversely affected by acid or alkali electrolytes, a galvanometer across the terminals of the cell graduated in terms of acidity and alkalinity and an automatically varied resistance across the terminal of the cell having its resistance varied in proportion to the temperature of the electrolyte within the cell.

4. Testing apparatus of the type described comprising a primary cell having electrodes reversely affected by acid or alkali electrolytes, a galvanometer across the terminals of the cell graduated in terms of acidity and alkalinity and adjustable means for determining the output of the cell delivered to the galvanometer.

5. Testing apparatus of the type described comprising a primary cell having electrodes reversely affected by acid or alkali electrolytes, a galvanometer across the terminals of the cell graduated in terms of acidity and alkalinity, one of said electrodes comprised of iron, the other of the electrodes comprising an alloy of antimony and cadmium.

6. Testing apparatus of the type described comprising a primary cell having electrodes reversely affected by acid or alkali electrolytes, a galvanometer across the terminals fo the cell graduated in terms of acidity and alkalinity, one of said electrodes comprised of iron, the other of the electrodes comprising an alloy of antimony and cadmium, the proportion of antimony to cadmium in the second named electrode being approximately ninety-five per centum antimony to five per centum cadmium.

7. Testing apparatus of the type described comprising a primary cell having electrodes reversely affected by acid or alkali electrolytes, a galvanometer across the terminals of the cell graduated in terms of acidity and alkalinity, means associated with the cell for preventing variation of the current output thereof due to changes in temperature of the electrolyte and means for neutralizing heat induced currents across the electrodes.

8. Testing apparatus of the type described comprising a primary cell having electrodes reversely affected by acid or alkali electrolytes, a galvanometer across the terminals of the cell graduated in terms of acidity and alkalinity and means for neutralizing heat induced currents across the electrodes.

In testimony whereof I hereunto affix my signature.

EMERY W. TODD.